United States Patent
Nowak et al.

(10) Patent No.: US 9,546,280 B2
(45) Date of Patent: Jan. 17, 2017

(54) STRUCTURAL COATINGS WITH DEWETTING AND ANTI-ICING PROPERTIES, AND COATING PRECURSORS FOR FABRICATING SAME

(71) Applicants: Andrew P. Nowak, Los Angeles, CA (US); Adam F. Gross, Santa Monica, CA (US); Michael H. Bartl, Salt Lake City, UT (US)

(72) Inventors: Andrew P. Nowak, Los Angeles, CA (US); Adam F. Gross, Santa Monica, CA (US); Michael H. Bartl, Salt Lake City, UT (US)

(73) Assignee: HRL Laboratories, LLC, Malibu, CA (US)

(*) Notice: Subject to any disclaimer, the term of this patent is extended or adjusted under 35 U.S.C. 154(b) by 189 days.

(21) Appl. No.: 13/708,642

(22) Filed: Dec. 7, 2012

(65) Prior Publication Data
US 2014/0162022 A1 Jun. 12, 2014

(51) Int. Cl.
| | | |
|---|---|---|
| C09D 5/00 | (2006.01) | |
| C09D 7/12 | (2006.01) | |
| C09D 175/04 | (2006.01) | |
| C09K 3/18 | (2006.01) | |

(Continued)

(52) U.S. Cl.
CPC . *C09D 5/00* (2013.01); *C09D 7/12* (2013.01); *C09D 7/1266* (2013.01);
(Continued)

(58) Field of Classification Search
CPC ....... C09D 7/12; B82Y 30/00; Y10T 428/244; Y10T 428/243; Y10S 977/773; C09K 3/18
(Continued)

(56) References Cited

U.S. PATENT DOCUMENTS

| | | |
|---|---|---|
| 6,071,336 A | 6/2000 | Fairchild et al. |
| 6,495,624 B1 | 12/2002 | Brown |

(Continued)

FOREIGN PATENT DOCUMENTS

| | | |
|---|---|---|
| EP | 2426179 A1 | 3/2012 |
| WO | 2005068400 A1 | 7/2005 |

(Continued)

OTHER PUBLICATIONS

Cao et al., "Anti-icing superhydrophobic coatings," Langmuir (2009), DOI: 10.1021/la902882b.
(Continued)

*Primary Examiner* — Nathan Van Sell
(74) *Attorney, Agent, or Firm* — O'Connor & Company

(57) ABSTRACT

Variations of this invention provide durable, impact-resistant structural coatings that have both dewetting and anti-icing properties. The coatings in some embodiments possess a self-similar structure that combines a low-cost matrix with two feature sizes that are tuned to affect the wetting of water and freezing of water on the surface. Dewetting and anti-icing performance is simultaneously achieved in a structural coating comprising multiple layers, wherein each layer includes (a) a continuous matrix; (b) discrete templates dispersed that promote surface roughness to inhibit wetting of water; and (c) nanoparticles that inhibit heterogeneous nucleation of water. These structural coatings utilize low-cost, lightweight, and environmentally benign materials that can be rapidly sprayed over large areas using convenient coating processes. The presence of multiple layers means that if the surface is damaged during use, freshly exposed surface will expose a coating identical to that which was removed, for extended lifetime.

40 Claims, 10 Drawing Sheets

(51) Int. Cl.
*B82Y 30/00* (2011.01)
*C08K 13/06* (2006.01)
*C08K 9/06* (2006.01)

(52) U.S. Cl.
CPC .............. *C09D 175/04* (2013.01); *C09K 3/18* (2013.01); *B82Y 30/00* (2013.01); *C08K 9/06* (2013.01); *C08K 13/06* (2013.01); *Y10S 977/773* (2013.01); *Y10T 428/2438* (2015.01); *Y10T 428/24372* (2015.01); *Y10T 428/24388* (2015.01); *Y10T 428/24405* (2015.01); *Y10T 428/24413* (2015.01); *Y10T 428/24421* (2015.01)

(58) Field of Classification Search
USPC .... 428/141–150; 977/773–787; 524/188, 80, 524/700, 497, 847
See application file for complete search history.

(56) References Cited

U.S. PATENT DOCUMENTS

| | | | |
|---|---|---|---|
| 7,150,904 | B2 | 12/2006 | D'Urso et al. |
| 7,258,731 | B2 | 8/2007 | D'Urso et al. |
| 7,419,615 | B2 | 9/2008 | Strauss |
| 7,754,279 | B2 | 7/2010 | Simpson et al. |
| 2007/0003705 | A1 | 1/2007 | Strauss |
| 2007/0298216 | A1* | 12/2007 | Jing et al. ............ 428/141 |
| 2010/0021745 | A1 | 1/2010 | Simpson et al. |
| 2012/0148825 | A1* | 6/2012 | Grosso et al. ......... 428/305.5 |
| 2012/0315461 | A1* | 12/2012 | Mehrabi .............. C08J 9/26 428/306.6 |
| 2013/0064990 | A1* | 3/2013 | Lu et al. ................ 427/535 |

FOREIGN PATENT DOCUMENTS

| | | |
|---|---|---|
| WO | 2007149617 A1 | 12/2007 |
| WO | 2012003004 A2 | 1/2012 |
| WO | WO 2012118805 A2 * | 9/2012 |

OTHER PUBLICATIONS

Conrad et al., "Ice nucleation on BaF2(111)," The Journal of Chemical Physics 122, 064709 (2005).

Deng et al., "Candle Soot as a Template for a Transparent Robust Superamphiphobic Coating," www.sciencexpress.org / Dec. 1, 2011 / 10.1126/science.1207115.

Guo et al., "Icephobic/Anti-Icing Properties of Micro/Nanostructured Surfaces," Adv. Mater. 2012, 24, 2642-2648.

Jung et al., "Mechanism of supercooled droplet freezing on surfaces," Nature Communications 3:615 (2012), DOI: 10.1038/ncomms1630.

Kim et al., "Liquid-Infused Nanostructured Surfaces with Extreme Anti-Ice and Anti-Frost Performance," ACS Nano, DOI: 10.1021/nn302310q • Publication Date (Web): Jun. 10, 2012.

Lai et al., "Markedly Controllable Adhesion of Superhydrophobic Spongelike Nanostructure TiO2 Films," Langmuir 2008, 24, 3867-3873.

Wang et al., "Self-Assembled Biomimetic Superhydrophobic CaCO3 Coating Inspired from Fouling Mineralization in Geothermal Water," Langmuir 2011, 27, 12275-12279, dx.doi.org/10.1021/la202613r.

Xu et al., "Transparent, Superhydrophobic Surfaces from One-Step Spin Coating of Hydrophobic Nanoparticles," ACS Appl. Mater. Interfaces (2012), dx.doi.org/10.1021/am201750h.

Zhai et al., "Stable Superhydrophobic Coatings from Polyelectrolyte Multilayers," Nano Lett., vol. 4, No. 7, 2004.

Zhang et al., "A facile method to prepare superhydrophobic coatings by calcium carbonate," Ind. Eng. Chem. Res. 2011, 50, 3089-3094.

Varanasi et al., "Frost formation and ice adhesion on superhydrophobic surfaces," Applied Physics Letters 97, 234102, 2010.

Gross et al., U.S. Appl. No. 13/836,208, Structural Coatings With Dewetting and Anti-Icing Properties and Processes for Fabricating These Coatings, filed Mar. 15, 2013 with USPTO.

* cited by examiner

STRUCTURAL COATINGS WITH DEWETTING AND ANTI-ICING PROPERTIES, AND COATING PRECURSORS FOR FABRICATING SAME

FIELD OF THE INVENTION

The present invention generally relates to durable, abrasion-resistant anti-icing coatings for various commercial applications.

BACKGROUND OF THE INVENTION

Ice-repellent coatings can have significant impact on improving safety in many infrastructure, transportation, and cooling systems. Among numerous problems caused by icing, many are due to striking of supercooled water droplets onto a solid surface. Such icing caused by supercooled water, also known as freezing rain, atmospheric icing, or impact ice, is notorious for glazing roadways, breaking tree limbs and power lines, and stalling airfoil of aircrafts.

When supercooled water impacts surfaces, icing may occur through a heterogeneous nucleation process at the contact between water and the particles exposed on the surfaces. Icing of supercooled water on surfaces is a complex phenomenon, and it may also depend on ice adhesion, hydrodynamic conditions, the structure of the water film on the surface, and the surface energy of the surface (how well the water wets it). The mechanism of heterogeneous ice nucleation on inorganic substrates is not well understood.

Melting-point-depression fluids are well-known as a single-use approach that must be applied either just before or after icing occurs. These fluids (e.g., ethylene or propylene glycol) naturally dissipate under typical conditions of intended use (e.g. aircraft wings, roads, and windshields). These fluids do not provide extended (e.g., longer than about one hour) deicing or anti-icing. Similarly, sprayed Teflon® or fluorocarbon particles affect wetting but are removed by wiping the surface. These materials are not durable.

Chemical character of a surface is one determining factor in the hydrophobicity or contact angle that the surfaces demonstrate when exposed to water. For a smooth untextured surface the maximum theoretical contact angle or degree of hydrophobicity possible is about 120°. Surfaces such a polytetrafluoroethylene or polydimethylsiloxane are examples of common materials that approach such contact angels.

Recent efforts for developing anti-icing or ice-phobic surfaces have been mostly devoted to utilize lotus leaf-inspired superhydrophobic surfaces. These surfaces fail in high humidity conditions, however, due to water condensation and frost formation, and even lead to increased ice adhesion due to a large surface area.

Superhydrophobicity, characterized by the high contact angle and small hysteresis of water droplets, on surfaces has been attributed to a layer of air pockets formed between water and a rough substrate. Many investigators have thus produced high contact angle surfaces through combinations of hydrophobic surface features combined with roughness or surface texture. One common method is to apply lithographic techniques to form regular features on a surface. This typically involves the creation of a series of pillars or posts that force the droplet to interact with a large area fraction of air-water interface. However, surface features such as these are not easily scalable due to the lithographic techniques used to fabricate them. Also, such surface features are susceptible to impact or abrasion during normal use. They are also single layers, which contributes to the susceptibility to abrasion.

Other investigators have produced coatings capable of freezing-point depression of water. This typically involves the use of small particles which are known to reduce freezing point. Single-layer nanoparticle coatings have been employed, but the coatings are not abrasion-resistant. Many of these coatings can actually be removed by simply wiping the surface, or through other impacts. Others have introduced melting depressants (salts or glycols) that leech out of surfaces. Once the leeching is done, the coatings do not work as anti-icing surfaces.

Nanoparticle-polymer composite coatings can provide melting-point depression and enable anti-icing, but they do not generally resist wetting of water on the surface. When water is not repelled from the surface, ice layers can still form that are difficult to remove. Even when there is some surface roughness initially, following abrasion the nanoparticles will no longer be present and the coatings will not function effectively as anti-icing surfaces.

Single layers of protrusions from coatings can show good anti-wetting behavior, but such coatings are not durable due to their inorganic structure. It was also shown recently that these structures do not control icing of surfaces Varanasi et al., "Frost formation and ice adhesion on superhydrophobic surfaces" *App. Phys. Lett.* 97, 234102 (2010).

There is a need in the art for scalable, durable, impact-resistant structural coatings that have both dewetting and anti-icing properties. Such coatings preferably utilize low-cost, lightweight, and environmentally benign materials that can be rapidly (minutes or hours, not days) sprayed or cast in thin layers over large areas using convenient coating processes. These structural coatings should be able to survive environments associated with aircraft and automotive applications over extended periods, for example.

SUMMARY OF THE INVENTION

The present invention addresses the aforementioned needs in the art, as will now be summarized and then further described in detail below.

In some variations, the invention provides a structural coating that inhibits wetting and freezing of water, the structural coating comprising one or more layers, wherein each layer includes:

(a) a substantially continuous matrix comprising a hardened material;

(b) a plurality of discrete templates dispersed within the matrix, wherein the discrete templates promote surface roughness at a surface of the layer, and wherein the surface roughness inhibits wetting of water; and (c) a plurality of nanoparticles with an average size of about 50 nanometers or less within the matrix, wherein the nanoparticles inhibit heterogeneous nucleation of water, wherein the structural coating preferably has a thickness from about 5 microns to about 500 microns.

In some embodiments, the thickness of the structural coating is from about 50 microns to about 100 microns, or about 10 microns to about 250 microns, such as about 10, 20, 30, 40, 50, 60, 70, 80, 90, 100, 150, 200, or 250 microns.

The discrete templates preferably are uniformly dispersed within the matrix. In some embodiments, the discrete templates have a length scale from about 50 nanometers to about 10 microns, such as from about 100 nanometers to about 3 microns. In some embodiments, at least some, or substantially all, of the discrete templates are anisotropic (e.g., geometrically asymmetric). The discrete templates may have an average particle size from about 1 micron to about 10 microns with individual needle projections or star protrusions having an aspect ratio from about 2 to about 20, for example. In some embodiments, the structural coating has an average density of discrete templates from about 0.1 to about 0.5 g/cm$^3$.

In some embodiments, the matrix includes porous voids surrounding at least a portion of the discrete templates, wherein the porous voids have a length scale from about 50 nanometers to about 10 microns, such as from about 100 nanometers to about 3 microns. The structural coating, in some embodiments, has a void density from about $10^{11}$ to about $10^{13}$ voids per cm$^3$. In various embodiments, the structural coating has a porosity from about 20% to about 70%.

In some embodiments, the nanoparticles have an average particle size from about 5 nanometers to about 50 nanometers, such as from about 10 nanometers to about 25 nanometers. At least a portion of the plurality of nanoparticles may be disposed on or adjacent to surfaces of the discrete templates. The nanoparticles may be chemically and/or physically bonded to or associated with the discrete templates.

In some embodiments, the hardened material comprises a crosslinked polymer, such as a crosslinked polymer selected from the group consisting of polyurethanes, epoxies, acrylics, phenolic resins including urea-formaldehyde resins and phenol-formaldehyde resins, urethanes, siloxanes, and combinations thereof.

In various embodiments, the matrix further comprises one or more additives selected from the group consisting of fillers, colorants, UV absorbers, defoamers, plasticizers, viscosity modifiers, density modifiers, catalysts, and scavengers.

In some embodiments, the discrete templates comprise an inorganic templating material selected from the group consisting of calcium carbonate, sodium chloride, sodium bromide, potassium chloride, tin (II) fluoride, iron oxides, and combinations thereof. The discrete templates comprise anisotropic calcium carbonate particles, in certain embodiments.

The discrete templates may optionally be surface-modified with a compound selected from the group consisting of fatty acids, silanes, alkyl phosphonates, alkyl phosphonic acids, alkyl carboxylates, and combinations thereof.

The nanoparticles may comprise a nanomaterial selected from the group consisting of silica, alumina, titania, zinc oxide, carbon, graphite, polytetrafluoroethylene, polystyrene, polyurethane, silicones, and combinations thereof, for example. The nanoparticles may comprise, or consist essentially of, silica. The nanoparticles may be surface-modified with a hydrophobic material, such as a hydrophobic material selected from alkylsilanes, fluoroalkylsilanes, alkyldisilazanes, or combinations thereof.

In some embodiments, the structural coating is characterized by a water contact angle of about 110° or higher, such as about 150° or higher. In some embodiments, the structural coating is characterized by a water roll-off angle of about 10° or less. In some embodiments, the structural coating is characterized by an ice melting-point depression to at least −10° C. The structural coating may be characterized, in some embodiments, by a kinetic delay of water freezing of at least 75 seconds.

Other variations provide effective coating precursors, such as a coating precursor for a structural coating that inhibits wetting and freezing of water, the coating precursor comprising:

(a) a hardenable material capable of forming a substantially continuous matrix for a structural coating;

(b) a plurality of discrete templates dispersed within the hardenable material; and (c) a plurality of nanoparticles with an average size of about 50 nanometers or less dispersed within the hardenable material.

The discrete templates may be uniformly dispersed within the hardenable material. The nanoparticles may be uniformly dispersed within the hardenable material. In some embodiments, the discrete templates have a length scale from about 50 nanometers to about 10 microns. At least some of the discrete templates may be anisotropic. In some embodiments, the discrete templates have an average particle size from about 1 micron to about 10 microns with individual needle projections or star protrusions having an aspect ratio from about 2 to about 20.

The nanoparticles may have an average particle size from about 5 nanometers to about 50 nanometers. In some embodiments, at least a portion of the plurality of nanoparticles is disposed on or adjacent to surfaces of the discrete templates. The nanoparticles may be chemically and/or physically bonded to or associated with the discrete templates.

The hardenable material may include a crosslinkable polymer selected from the group consisting of polyurethanes, epoxies, acrylics, phenolic resins including urea-formaldehyde resins and phenol-formaldehyde resins, urethanes, siloxanes, and combinations thereof. The coating precursor may further comprise an effective amount of a solvent or carrier for the hardenable material. For example, a solvent may be selected from the group consisting of water, alcohols, ketones, organic acids, hydrocarbons, alkyl acetates, and combinations thereof.

In some embodiments, a coating precursor further comprises one or more additives selected from the group consisting of fillers, colorants, UV absorbers, defoamers, plasticizers, viscosity modifiers, density modifiers, catalysts, and scavengers.

In some embodiments of coating precursors, the discrete templates comprise an inorganic templating material selected from the group consisting of calcium carbonate (e.g., anisotropic calcium carbonate particles), sodium chloride, sodium bromide, potassium chloride, tin (II) fluoride, iron oxides, and combinations thereof.

The discrete templates may be surface-modified with a compound selected from the group consisting of fatty acids, silanes, alkyl phosphonates, alkyl phosphonic acids, alkyl carboxylates, and combinations thereof.

The nanoparticles may comprise a nanomaterial selected from the group consisting of silica, alumina, titania, zinc oxide, carbon, graphite, polytetrafluoroethylene, polystyrene, polyurethane, silicones, and combinations thereof. The nanoparticles may be surface-modified with a hydrophobic material selected from alkylsilanes, fluoroalkylsilanes, or both.

Variations of the invention also provide a structural coating that inhibits wetting and freezing of water, the structural coating comprising a single layer or multiple layers wherein each layer is derived from a coating precursor; wherein the coating precursor comprises:

(a) a hardenable material capable of forming a substantially continuous matrix for a structural coating;

(b) an effective amount of a solvent for the hardenable material;

(c) a plurality of discrete templates dispersed within the hardenable material; and (d) a plurality of nanoparticles with an average size of about 50 nanometers or less dispersed within the hardenable material.

In some embodiments of this structural coating, the layer or layers include(s) a substantially continuous matrix; a plurality of discrete templates dispersed within the matrix, wherein the discrete templates promote surface roughness at a surface of the layer, and wherein the surface roughness inhibits wetting of water; and a plurality of nanoparticles with an average size of about 50 nanometers or less within the matrix, wherein the nanoparticles inhibit heterogeneous nucleation of water.

DETAILED DESCRIPTION OF EMBODIMENTS OF THE INVENTION

Figure 1:
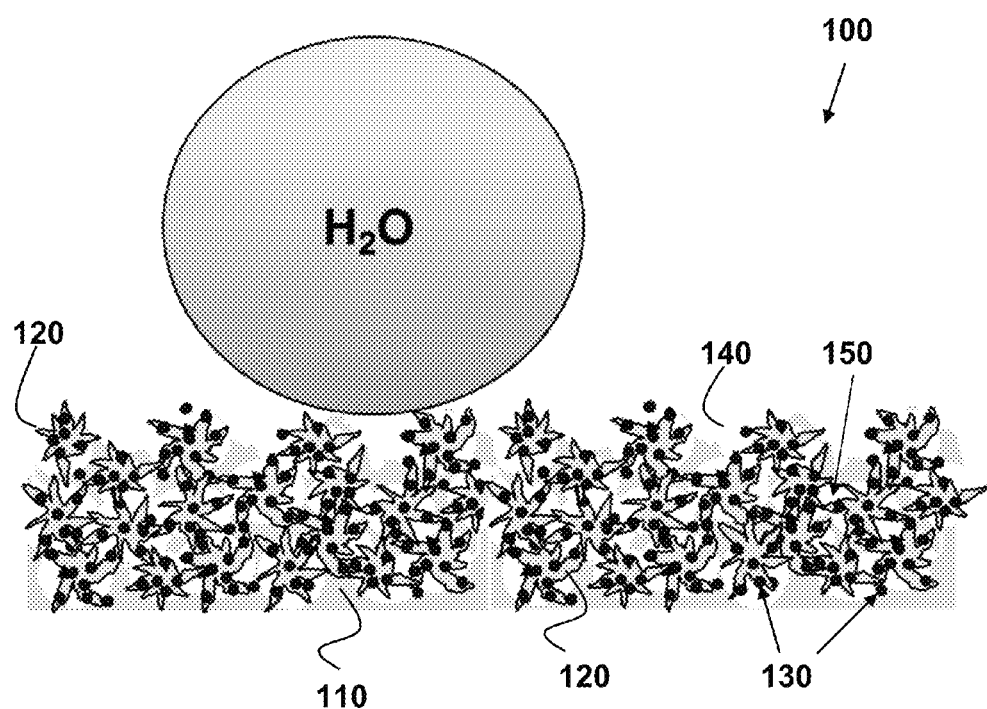
FIG. 1 is a schematic of a structural coating, in some embodiments of the invention (a water droplet is depicted for illustration only).

The compositions, apparatus, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Some variations are premised on the discovery of structural coatings that simultaneously repel water and inhibit the formation of ice. These structural coatings possess a self-similar structure that utilizes a continuous matrix and, within the matrix, two feature sizes that are tuned to adjust the wetting of water and freezing of water on the surface that is coated. Unexpectedly, it has been discovered that the surface roughness and voids that drive high-contact-angle dewetting behavior may be created through judicious selection of template morphology, utilizing templates that do not need to be removed from the structure.

For water to freeze into ice, a water droplet must reach the surface and then remain on the surface for a time sufficient for ice nucleation and water solidification. The present invention can render it more difficult for water to remain on the surface, while increasing the time that would be necessary for water, if it does remain on the surface, to then form ice. The present inventors have realized that by attacking the problem of surface ice formation using multiple length scales and multiple physical phenomena, particularly beneficial structural coatings may be fabricated.

As used herein, an "anti-icing" (or equivalently, "icephobic") surface or material means that the surface or material, in the presence of liquid water or water vapor, is characterized by the ability to (i) depress the freezing point of water (normally 0° C. at atmospheric pressure) and (ii) delay the onset of freezing of water at a temperature below the freezing point.

Note that in this specification, reference may be made to water "droplets" but that the invention shall not be limited to any geometry or phase of water that may be present or contemplated. Similarly, "water" does not necessarily mean pure water. Any number or type of impurities or additives may be present in water, as referenced herein.

In some variations of the present invention, an anti-icing structural coating may be designed to repel water as well as inhibit the solidification of water from a liquid phase (freezing), a gas phase (deposition), and/or an aerosol (combined freezing-deposition). Preferably, anti-icing structural coatings are capable of both inhibiting ice formation and of inhibiting wetting of water at surfaces. However, it should be recognized that in certain applications, only one of these properties may be necessary.

Coating dewetting and anti-icing performance is dictated by certain combinations of structural and compositional features within the structural coating. The structural coating may be formed using, as a continuous matrix, a durable (damage-tolerant) and tough crosslinked polymer. Within the continuous matrix, there are two types of particles characterized by two different length scales in the structural coating that separately control the wetting and freezing of water on the surface.

The first type of particles is a discrete template that promotes porosity within the continuous matrix (porous voids) as well as at the surface of the coating (surface roughness). The second type of particle is a nanoparticle that inhibits heterogeneous nucleation of ice.

As intended herein, a "void" or "porous void" is a discrete region of empty space, or space filled with air or another gas, that is enclosed within the continuous matrix. The voids may be open (e.g., interconnected voids) or closed (isolated within the continuous matrix, or a combination thereof. As intended herein, "surface roughness" means that the texture of a surface has vertical deviations that are similar to the porous voids, but not fully enclosed within the continuous matrix. In some embodiments, the size and shape of the selected discrete templates will dictate both a dimension of the porous voids as well as a roughness parameter that characterizes the surface roughness.

The discrete templates preferably have a length scale from about 50 nanometers to about 10 microns, such as from about 100 nanometers to about 3 microns. Here, a length scale refers for example to a diameter of a sphere, a height or width of a rectangle, a height or diameter of a cylinder, a length of a cube, an effective diameter of a template with arbitrary shape, and so on. For example, the discrete templates may have one or more length scales that are a distance of about 50 nm, 75 nm, 100 nm, 150 nm, 200 nm, 250 nm, 350 nm, 500 nm, 750 nm, 1 µm, 2 µm, 3 µm, 5 µm, 8 µm, or 10 µm, including any distance that is intermediate to any of the recited values.

In some embodiments, the discrete templates are dispersed uniformly in the continuous matrix. The discrete templates may be characterized as colloidal templates, in some embodiments. The discrete templates themselves may possess multiple length scales. For example, the discrete templates may have an average overall particle size as well as another length scale associated with porosity, surface area, surface layer, sub-layer, protrusions, or other physical features.

In preferred embodiments, the discrete templates are anisotropic. As meant herein, "anisotropic" templates have at least one chemical or physical property that is directionally dependent. When measured along different axes, an anisotropic template will have some variation in a measurable property. The property may be physical (e.g., geometrical) or chemical in nature, or both. The property that varies along multiple axes may simply be the presence of template mass; for example, a perfect sphere would be geometrically isotropic while a three-dimensional star shape would be anisotropic. A chemically anisotropic template may vary in composition from the surface to the bulk phase, such as via a coating, for example. The amount of variation of a chemical or physical property, measured along different axes, may be 5%, 10%, 20%, 30%, 40%, 50%, 75%, 100% or more.

In some embodiments, an anisotropic template is geometrically asymmetric in one, two, or three dimensions. As one illustration, the templates may be rectangular with an aspect (height/width) ratio of 2:1. Note that even if a template is geometrically symmetric, it still may be chemically or physically anisotropic. For example, the density of a spherical template may vary from the outer shell to the inner material.

In some embodiments, the discrete templates have an anisotropic acicular shape. "Acicular" refers to a crystal habit (external shape) characterized by a mass of slender, but rigid, needle-like crystals radiating from a central point. In some embodiments, the discrete templates have an anisotropic "scalenohedral" or star-shaped crystal habit. The acicular or scalenohedral discrete templates may have an average particle size from about 1 µm to about 10 µm with individual needle projections (or star protrusions) having an aspect ratio from about 2 to about 20, for example. In some embodiments, the discrete templates have an anisotropic prismatic shape with blades that are generally not as sharp as the needles in acicular shapes. Various other rhombohedra, tabular forms, prisms, or scalenohedra are also possible for anisotropic discrete templates, in the context of the present invention.

The discrete templates, dispersed within the continuous matrix, create porous voids. These porous voids preferably have a length scale from about 50 nanometers to about 10 microns, such as from about 100 nanometers to about 1 micron. For example, the porous voids may have one or more length scales that are a distance of about 50 nm, 75 nm, 100 nm, 150 nm, 200 nm, 250 nm, 350 nm, 500 nm, 750 nm, 0.9 µm, 0.95 µm, 1 µm, 2 µm, 3 µm, or 5 µm, including any distance that is intermediate to any of the recited values.

Typically, even when the discrete templates are all characterized by a specific geometry, the porous voids that result from the templates will be random in shape and size. Thus, the length scale of a porous void may be an effective diameter of a porous void with arbitrary shape, for example, or the minimum or maximum distance between adjacent particles, and so on.

The size of the porous voids, typically, is primarily a function of the size and shape of the discrete templates. This does not mean that the size of the voids is the same as the size of the discrete templates. The length scale of the porous void may be smaller or larger than the length scale of the discrete templates, depending on the nature of the templates, the packing density, and the method to produce the structure. In some embodiments, the average size of the porous voids is smaller than the average size of the discrete templates. For example, in certain embodiments the discrete templates have an average length scale of about 100 nm while the associated porous voids have an average length scale of about 50 nm.

The discrete templates, at a surface of the continuous matrix, create surface roughness that preferably has a length scale from about 10 nanometers to about 10 microns, such as from about 50 nanometers to about 1 micron. The length scale of surface roughness may be any number of roughness parameters known in the art, such as, but not limited to, arithmetic average of absolute deviation values, root-mean squared deviation, maximum valley depth, maximum peak height, skewness, or kurtosis. For example, the surface roughness may have one or more roughness parameters of about 10 nm, 25 nm, 50 nm, 75 nm, 100 nm, 150 nm, 200 nm, 250 nm, 350 nm, 500 nm, 750 nm, 1 µm, 2 µm, 3 µm, or 5 µm, including any distance that is intermediate to any of the recited values.

The length scale of surface roughness may be similar to the length scale of porous voids, arising from the fact that both the porous voids and the surface roughness result, at least in part, from the presence of the same discrete templates. It should also be noted, however, that the nanoparticles (with sizes as discussed below) may contribute some degree of surface roughness, independently from the contribution by the discrete templates. The surface roughness caused by the nanoparticles is typically a smaller contribution, although some of the above-recited roughness parameters may be biased more heavily by the nanoparticles.

In some embodiments, the structural coating has an average porosity of from about 20% to about 70%, such as about 40%, 45%, 50%, 55%, or 60%, as measured by mercury intrusion or another technique. In some embodiments, the structural coating has an average void density of from about $10^{11}$ to about $10^{13}$ voids per $cm^3$, such as about $2\times10^{11}$, $5\times10^{11}$, $8\times10^{11}$, $10^{12}$, $2\times10^{12}$, $5\times10^{12}$, or $8\times10^{12}$ voids per $cm^3$. In some embodiments, the structural coating has an average density of discrete templates of from about 0.1 to about 0.5 $g/cm^3$, such as about 0.15, 0.2, 0.25, 0.3, 0.35, or 0.4 $g/cm^3$.

The continuous matrix and the discrete templates are homogeneous on the length scale of roughness at the coating surface, in some embodiments. The coating surface preferably does not have substructures with high aspect ratios (normal to the surface) protruding out from the surface.

The nanoparticles within the continuous matrix preferably have a length scale from about 5 nanometers (nm) to about 50 nm, such as about 10 nm to about 25 nm. Here, a nanoparticle length scale refers for example to a diameter of a sphere, a height or width of a rectangle, a height or diameter of a cylinder, a length of a cube, an effective diameter of a nanoparticle with arbitrary shape, and so on. For example, the nanoparticles may have one or more length scales that are a distance of about 2 nm, 3 nm, 4 nm, 5 nm, 6 nm, 7 nm, 8 nm, 10 nm, 15 nm, 20 nm, 25 nm, 30 nm, 35 nm, 40 nm, 45 nm, or 50 nm, including any distance that is intermediate to any of the recited values. Generally speaking, the nanoparticles are smaller than the discrete templates.

The discrete templates are preferably dispersed uniformly within the continuous matrix. The nanoparticles may be chemically and/or physically bonded to, or otherwise associated with, the discrete templates. Alternatively, or additionally, the nanoparticles may be dispersed uniformly within the continuous matrix but not necessarily directly associated with the discrete templates. Within a porous void, the nanoparticles may cover pore internal surfaces. However, nanoparticles should not be continuous across entire pores, i.e. the nanoparticles should not create an interpenetrating substructure.

Without being limited to any hypotheses, it is believed that the discrete templates, and their associated porous voids and surface roughness, inhibit water infiltration and provide an anti-wetting surface. It is believed that the nanoparticles depress the melting point of ice, i.e. lower the temperature at which water will be able to freeze. In addition, the nanoparticles may act as emulsifiers and change the matrix-air interactions to affect how the matrix (e.g., polymer) wets around the larger discrete templates. The continuous matrix preferably offers durability, impact resistance, and abrasion resistance to the structural coating.

Due to the multiple length scales and hierarchical structure that produces strong dewetting performance, the continuous matrix material and discrete templates do not necessarily need to be strongly hydrophobic. This is in contrast to what is taught in the art—namely, that coating components should possess high inherent hydrophobicity. Furthermore, the coating morphology in embodiments of this invention preferably avoids single layers of high-aspect-ratio protrusions from the outer surface. Such protrusions, which are typically made from inorganic oxides, can be easily abraded by surface contact and can render the coating non-durable. In embodiments herein, the absence of such protrusions, along with the presence of a durable continuous matrix (e.g., a tough polymeric framework), gives the final coating good resistance to abrasion and impact.

In addition, in some embodiments, more than one layer is present in the coating. A multiple-layer structural coating offers a repeating, self-similar structure that allows the coating to be abraded during use while retaining anti-wetting and anti-icing properties. Should the surface be modified due to environmental events or influences, the self-similar nature of the structural coating allows the freshly exposed surface to present a coating identical to that which was removed. The number of layers in a structural coating may be, for example, 1, 2, 3, 4, 5, 6, 7, 8, 9, 10, 12, 15, 20, 25, or more. A single layer, of sufficient thickness, may also consist of a self-similar structure that allows the coating to be abraded during use while retaining anti-wetting and anti-icing properties.

Each layer of the structural coating thus preferably includes (a) a substantially continuous matrix; (b) a plurality of discrete templates dispersed within the matrix, wherein the discrete templates promote surface roughness at a surface, or potential surface, of the layer; and (c) a plurality of nanoparticles within the matrix. Some embodiments of the invention employ a single layer.

The anti-wetting feature of the structural coating is created, at least in part, by surface roughness that increases the effective contact angle of water with the substrate as described in the Cassie-Baxter equation:

$$\cos \theta_{eff} = \phi_{solid}(\cos \theta_{solid}+1)-1$$

where $\theta_{eff}$ is the effective contact angle of water, $\phi_{solid}$ is the area fraction of solid material when looking down on the surface, and $\theta_{solid}$ is the contact angle of water on a hypothetical non-porous flat surface formed from the materials in the coating. A water-air interface at the droplet surface is assumed, giving rise to the extreme contact angle of 180° associated with air (cos 180°=−1). A hydrophilic surface results when $\theta_{eff}<90°$, whereas a hydrophobic surface results when $\theta_{eff}>90°$. A superhydrophobic surface results when $\theta_{eff}\geq150°$.

By choosing a hydrophobic material for the coating (large $\theta_{solid}$) and a high porosity (small $\phi_{solid}$), the effective contact angle $\theta_{eff}$ will be maximized. Increasing the concentration of porous voids at the surface increases the contact angle $\theta_{eff}$. It should be noted that $\theta_{solid}$ is the effective contact angle of the composite materials which include the discrete templates, nanoparticles, and continuous matrix. As a result, any individual component of the coating may have a hydrophilic character, as long as the net $\theta_{solid}$ is hydrophobic ($\phi_{solid}>90°$).

Minimization of $\phi_{solid}$ and maximization of $\theta_{solid}$ act to reduce the liquid-substrate contact area per droplet, reducing the adhesion forces holding a droplet to the surface. As a result, water droplets impacting the surface can bounce off cleanly. This property not only clears the surface of water but helps prevents the accumulation of ice in freezing conditions (including ice that may have formed homogeneously, independently from the surface). It also reduces the contact area between ice and the surface to ease removal.

In various embodiments, the effective contact angle of water $\theta_{eff}$ in the presence of a structural coating provided herein is at least 90°, such as 95°, 100°, or 105°; and preferably at least 110°, such as 115°, 120°, 125°, 130°, 135°, 140°, 145°, 150°, or higher.

The anti-icing feature of the structural coating is created, at least in part, by increasing the effective contact angle of water as described above. The anti-icing feature of the structural coating is also created, at least in part, from the incorporation of nanoparticles within the continuous matrix and, in particular, at the surface of the structural coating. As described above, nanoparticles typically in the size range of about 5-50 nm may inhibit the nucleation of ice.

In some embodiments, moderately hydrophobic, highly hydrophobic, or superhydrophobic nanoparticles reduce the melting temperature of ice (which equals the freezing temperature of water) at least some amount lower than 0° C., and as low as about 40° C. This phenomenon is known as melting-point depression (or equivalently, freezing-point depression). In various embodiments, nanoparticles reduce the melting temperature of ice at least down to −5° C., such as about −6° C., −7° C., −8° C., −9° C., −10° C., −11° C., −12° C., −13° C., −14° C., −15° C., −16° C., −17° C., −18° C., −19° C., −20° C., −21° C., −22° C., −23° C., −24° C., or −25° C., for example.

Highly textured surfaces with low liquid-substrate contact areas will slow the onset of freezing of droplets on a surface by reducing conductive heat transfer to freezing substrates. The transport of heat by conduction is reduced (slower) when there are gaps between the water droplet and the solid substrate. Also, highly textured surfaces with low liquid-substrate contact areas will reduce the rate of heterogeneous nucleation due to fewer nucleation sites. The kinetics of heterogeneous ice formation will be slowed when there are fewer nucleation sites present.

The delay of the onset of droplet freezing, or the "kinetic delay of freezing," may be measured as the time required for a water droplet to freeze, at a given test temperature. The test temperature should be lower than 0° C., such as −5° C., −10° C., −15° C., or another temperature of interest, such as for a certain application of the coating. Even an uncoated substrate will generally have some kinetic delay of freezing. The structural coating provided herein is characterized by a longer kinetic delay of freezing than that associated with the same substrate, in uncoated form, at the same environmental conditions. This phenomenon is also the source of melting-point depression.

In various embodiments, the kinetic delay of freezing measured at about −5° C. is at least about 30 seconds, 35 seconds, 40 seconds, 50 seconds, 60 seconds, 70 seconds, 80 seconds, 81 seconds, 82 seconds, 85 seconds, 90 seconds, 100 seconds or more. In various embodiments, the kinetic delay of freezing measured at about −10° C. is at least about 30 seconds, 35 seconds, 40 seconds, 50 seconds, 60 seconds, 70 seconds, 80 seconds, 85 seconds, 90 seconds, 91 seconds, 92 seconds, 93 seconds, 95 seconds, 100 seconds, or more. In some embodiments, the kinetic delay of freezing is about 40, 45, 50, 55, 60, 65, or 70 seconds longer when the structural coating is present, compared to an uncoated substrate, measured at about −5° C. or about −10° C.

The melting-point depression and kinetic delay of freezing allow a greater chance of the liquid water to be cleared from the surface before ice formation takes place. This is especially efficacious in view of the low adhesion and anti-wetting properties (large effective contact angle of preferred structural coatings. The problem of ice formation on surfaces has essentially been attacked using multiple length scales and multiple physical phenomena.

A schematic of a structural coating 100, in some embodiments, is shown in FIG. 1. An exemplary water droplet is depicted in FIG. 1, with the understanding that a water droplet is of course not necessarily present. The structural coating 100 includes a continuous matrix 110, discrete templates 120, and nanoparticles 130. The structural coating 100 is further characterized by surface roughness 140 and internal porous voids 150.

The "continuous matrix" (or equivalently, "substantially continuous matrix") in the structural coating means that the matrix material is present in a form that includes chemical bonds among molecules of the matrix material. An example of such chemical bonds is crosslinking bonds between polymer chains. In a substantially continuous matrix, there may be present various voids (separate from the porous voids associated with the discrete templates), defects, cracks, broken bonds, impurities, additives, and so on.

In some embodiments, the continuous matrix comprises a crosslinked polymer. In some embodiments, the continuous matrix comprises a matrix material selected from the group consisting of polyurethanes, epoxies, acrylics, urea-formaldehyde resins, phenol-formaldehyde resins, urethanes, siloxanes, ethers, esters, amides, and combinations thereof. In some embodiments, the matrix material is hydrophobic; however, the continuous matrix does not require a hydrophobic matrix material.

In some embodiments, the continuous matrix includes chemical bonds formed typically radical-addition reaction mechanisms with groups such as (but not limited to) acrylates, methacrylates, thiols, ethylenically unsaturated species, epoxides, or mixtures thereof. Crosslinking bonds may also be formed via reactive pairs including isocyanate/amine, isocyanate/alcohol, and epoxide/amine. Another mechanism of crosslinking may involve the addition of silyl hydrides with ethylenically unsaturated species. In addition, crosslinking bonds may be formed through condensation processes involving silyl ethers and water along with phenolic precursors and formaldehyde and/or urea and formaldehyde.

Optionally, the continuous matrix may further comprise one or more additives selected from the group consisting of fillers, colorants, UV absorbers, defoamers, plasticizers, viscosity modifiers, density modifiers, catalysts, and scavengers.

The discrete templates may comprise an inorganic templating material. For example, the inorganic templating material may be selected from the group consisting of calcium carbonate, sodium chloride, sodium bromide, potassium chloride, tin (II) fluoride, iron oxides (e.g., $Fe_2O_3$, $Fe_3O_4$, or FeOOH), and combinations thereof. The discrete templates may be surface-modified with a compound selected from the group consisting of fatty acids, silanes, alkyl phosphonates, alkyl phosphonic acids, alkyl carboxylates, and combinations thereof.

In some embodiments, the discrete templates comprise calcium carbonate ($CaCO_3$) particles. The calcium carbonate may be treated or sized in various ways. For example, the calcium carbonate may be modified with a fatty acid (e.g., sodium stearate) to increase hydrophobicity. The calcium carbonate may be obtained or prepared from solution, and may be milled to reduce particle size. In certain preferred embodiments, the calcium carbonate includes at least 25 wt %, at least 50 wt %, at least 75 wt %, or at least 95 wt % anisotropic calcium carbonate particles, including essentially all of the calcium carbonate being present in anisotropic form (e.g., scalenohedral or acicular).

In some embodiments, the nanoparticles comprise a nanomaterial selected from the group consisting of silica, alumina, titania, zinc oxide, carbon, graphite, polytetrafluoroethylene, polystyrene, polyurethane, silicones, and combinations thereof. In certain embodiments, the nanoparticles comprise silica. Other nanoparticles are possible, as will be appreciated. Optionally, the nanoparticles may be surface-modified with a hydrophobic material, such as (but not limited to) an alkylsilane, a fluoroalkylsilane, and/or an alkyldisilazane (e.g., hexamethyldisilazane).

A wide range of concentrations of components may be present in the structural coating. For example, the continuous matrix may be from about 5 wt % to about 95 wt %, such as from about 10 wt % to about 40 wt % of the structural coating. The discrete templates may be from about 1 wt % to about 90 wt %, such as from about 50 wt % to about 80 wt % of the structural coating. The nanoparticles may be from about 0.1 wt % to about 25 wt %, such as from about 1 wt % to about 10 wt % of the structural coating. In certain embodiments, the structural coating includes about 70-80 wt % discrete templates and about 4-8 wt % nanoparticles in about 15-25 wt % of a continuous matrix, such as about 74 wt % discrete templates and about 6 wt % nanoparticles in about 20 wt % of a continuous matrix. In various embodiments, the structural coating includes about 5-50 wt % discrete templates and about 0.5-10 wt % nanoparticles in about 50-90 wt % of a continuous matrix.

Any known methods to fabricate these structural coatings may be employed. Notably, these structural coatings may utilize synthesis methods that enable simultaneous deposition of components to reduce fabrication cost and time. In particular, these coatings may be formed by a one-step process, in some embodiments. In other embodiments, these coatings may be formed by a multiple-step process. For ease of application, a one-step process is preferred.

In a preferred one-step process, a coating precursor is prepared and then dispensed (deposited) over an area of interest. Any known methods to deposit coating precursors may be employed. The fluid nature of the coating precursor allows for convenient dispensing using spray coating or casting techniques over a large area, such as the scale of a vehicle or aircraft.

In some variations, a coating precursor comprises:

(a) a hardenable material capable of forming a substantially continuous matrix for a structural coating;

(b) a plurality of discrete templates dispersed (preferably in a uniform fashion) within the hardenable material; and (c) a plurality of nanoparticles with an average size of about 50 nanometers or less dispersed within the hardenable material.

The hardenable material may be any organic oligomeric or polymeric mixture that is capable of being hardened or cured (crosslinked). The hardenable material may be dissolved in a solvent to form a solution, or suspended in a carrier fluid to form a suspension, or both of these. The hardenable material may include low-molecular-weight components with reactive groups that subsequently react (using heat, radiation, catalysts, initiators, or any combination thereof) to form a continuous three-dimensional network as the continuous matrix. This network may include crosslinked chemicals (e.g. polymers), or other hardened material (e.g., precipitated compounds).

Discrete templates and nanoparticles are dispersed with the hardenable material. The discrete templates and nanoparticles are preferably not dissolved in the hardenable material, i.e., they should remain as discrete components in the final structural coating. In some embodiments, the discrete templates and/or nanoparticles may dissolve into the hardenable material phase but then precipitate back out of the material as it is curing, so that in the final structural coating, the discrete templates and/or nanoparticles are distinct (e.g., as in FIG. 1).

Thus in some embodiments, a process for fabricating a structural coating includes preparing a hardenable material, introducing discrete templates and nanoparticles into the hardenable material to form a fluid mixture (solution or suspension), applying the fluid mixture to a selected surface, and allowing the fluid mixture to cure to form a solid. This process is optionally repeated to form multiple layers, resulting in the structural coating. The hardenable material is essentially the precursor to the continuous matrix, i.e. the hardened or cured form of the hardenable material is the continuous matrix of the structural coating. The porous voids and surface roughness in the coating may form as part of the curing or hardening process.

In some embodiments, the hardenable material is a crosslinkable polymer selected from the group consisting of polyurethanes, epoxies, acrylics, urea-formaldehyde resins, phenol-formaldehyde resins, urethanes, siloxanes, ethers, esters, amides, and combinations thereof. The hardenable material may be combined with one or more additives selected from the group consisting of fillers, colorants, UV absorbers, defoamers, plasticizers, viscosity modifiers, density modifiers, catalysts, and scavengers.

The fluid mixture may be applied to a surface using any coating technique, such as (but not limited to) spray coating, dip coating, doctor-blade coating, spin coating, air knife coating, curtain coating, single and multilayer slide coating, gap coating, knife-over-roll coating, metering rod (Meyer bar) coating, reverse roll coating, rotary screen coating, extrusion coating, casting, or printing. Because relatively simple coating processes may be employed, rather than lithography or vacuum-based techniques, the fluid mixture may be rapidly sprayed or cast in thin layers over large areas (such as multiple square meters).

When a solvent is present in the fluid mixture, the solvent may include one or more compounds selected from the group consisting of water, alcohols (such as methanol, ethanol, isopropanol, or tert-butanol), ketones (such as acetone, methyl ethyl ketone, or methyl isobutyl ketone), hydrocarbons (e.g., toluene), acetates (such as tert-butyl acetate), organic acids, and any mixtures thereof. When a solvent is present, it may be in a concentration of from about 10 wt % to about 99 wt % or higher, for example. An effective amount of solvent is an amount of solvent that dissolves at least 95% of the hardenable material present. Preferably, a solvent does not adversely impact the formation of the hardened (e.g., crosslinked) network and does not dissolve/swell the discrete templates or nanoparticles.

When a carrier fluid is present in the fluid mixture, the carrier fluid may include one or more compounds selected from the group consisting of water, alcohols, ketones, acetates, hydrocarbons, acids, bases, and any mixtures thereof. When a carrier fluid is present, it may be in a concentration of from about 10 wt % to about 99 wt % or higher, for example. An effective amount of carrier fluid is an amount of carrier fluid that suspends at least 95% of the hardenable material present. A carrier fluid may also be a solvent, or may be in addition to a solvent, or may be used solely to suspend but not dissolve the hardenable material. A carrier fluid may be selected to suspend the discrete templates and/or nanoparticles in conjunction with a solvent for dissolving the hardenable material, in some embodiments.

A wide range of concentrations of components may be present in the coating precursor. For example, the hardenable material may be from about 5 wt % to about 90 wt %, such as from about 10 wt % to about 40 wt % of the coating precursor on a solvent-free and carrier fluid-free basis. The discrete templates may be from about 1 wt % to about 90 wt %, such as from about 50 wt % to about 80 wt % of the coating precursor on a solvent-free and carrier fluid-free basis. The nanoparticles may be from about 0.1 wt % to about 25 wt %, such as from about 1 wt % to about 10 wt % of the coating precursor on a solvent-free and carrier fluid-free basis. In certain embodiments, the coating precursor includes about 70-80 wt % discrete templates and about 4-8 wt % nanoparticles in about 15-25 wt % of a hardenable material, such as about 74 wt % discrete templates and about 6 wt % nanoparticles in about 20 wt % of a hardenable material, on a solvent-free and carrier fluid-free basis. In various embodiments, the coating precursor includes about 50-90 wt % of a hardenable material, about 0.5-10 wt % nanoparticles, and about 5-50 wt % discrete templates.

The structural coating that is produced at least from hardening one or more layers of the coating precursor is a self-similar, multi-scale structure with good abrasion resistance. The plurality of similar layers—or sufficient amount of self-similar material—means that following impact or abrasion of the coating, which may remove or damage a layer, there will be another layer under the removed/damaged layer that presents the same functionality. Additional layers that do not include one or more of the continuous matrix, discrete templates, and nanoparticles may be present. Such additional layers may be underlying base layers, additive layers, or ornamental layers (e.g., coloring layers).

The overall thickness of the structural coating may be from about 1 μm to about 1 cm or more, such as about 10 μm, 100 μm, 1 mm, 1 cm, or 10 cm. Relatively thick coatings offer good durability and mechanical properties, such as impact resistance, while preferably being relatively lightweight. In preferred embodiments, the coating thickness is about 5 μm to about 500 μm, such as about 50 μm to about 100 μm.

In some embodiments, the thickness of the structural coating is from about 50 microns to about 100 microns, or about 10 microns to about 250 microns, such as about 10, 20, 30, 40, 50, 60, 70, 80, 90, 100, 150, 200, or 250 microns. Other coating thicknesses are possible as well.

EXAMPLES

Bahydrol® 2770 (polyurethane), Bahydrol® 2058 (polyurethane), and Bayhydur® 2655 (polyisocyanate) are obtained from Bayer Materials Science (Pittsburgh, Pa., US). Hexamethyldisilazane (HMDZ)-treated silica is a product of Gelest (Morrisville, Pa., US). Precipitated Calcium Carbonate (Magnum Fill HO97) is a product of Mississippi Lime (St. Louis, Mo., US). All items are used as received without further purification. Spray coating is carried out using an Ampro A6034 low-volume, low-pressure spray gun.

Example 1

Bahydrol 2770 (1 g), Bahydrol 2058 (0.16 g), and Bayhydur 2655 (0.5 g) are weighed out and combined into a 50 mL centrifuge tube. Following this, HMDZ-treated silica (0.5 g) is added to the container along with precipitated calcium carbonate (6 g, Magnum Fill HO97). Finally, deionized water (10 g) is added, and the tube is capped and agitated vigorously for 1 minute. At this point the mixture shows a thick creamy homogenous consistency. If any aggregates are visible, agitation is continued until the mixture is smooth.

Next, additional deionized water (20 g) is added to thin the mixture and the solution is blended with a high-speed mixer (Omni Mixer Homogenizer) for 5 minutes. The fluid solution is then transferred to a handheld sprayer and applied to aluminum panels (such as, but not limited to, aluminum panels). The full coating is deposited by coating the entire panel in layers and waiting for 15 minutes between coats until the desired coating thickness is achieved.

Figure 2A:
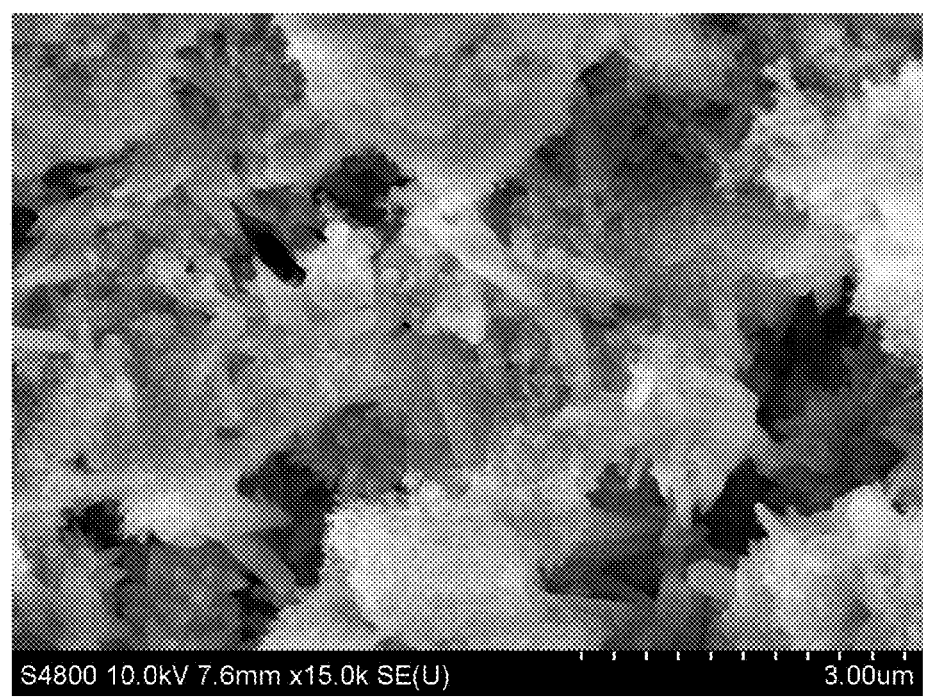
FIG. 2A is a high magnification SEM image of a structural coating according to Example 1.
Figure 2B:
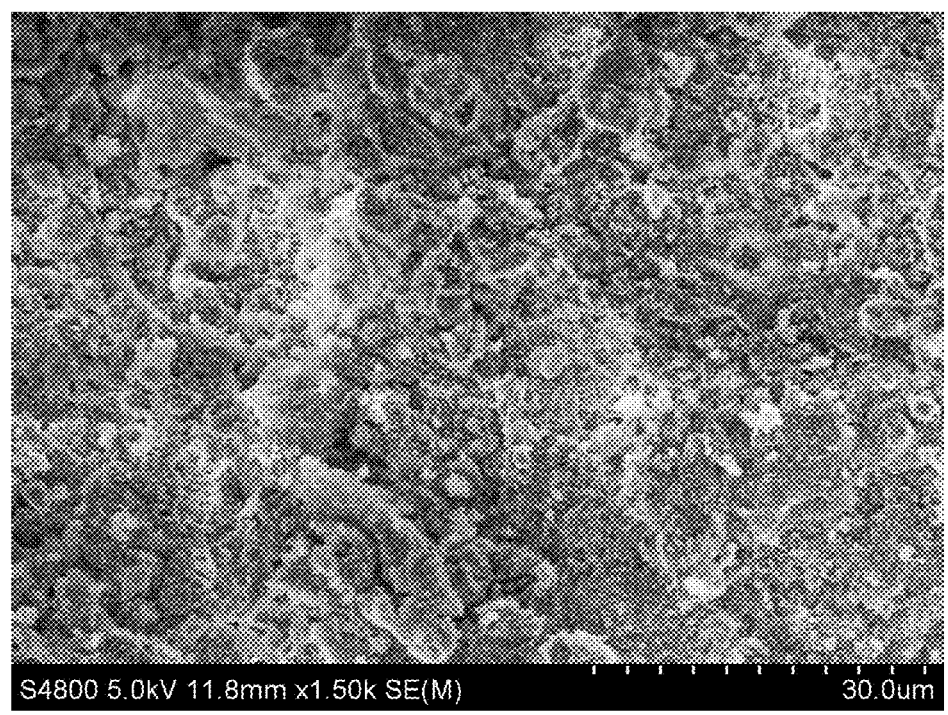
FIG. 2B is a low magnification SEM image of a structural coating according to Example 1.
Figure 3:
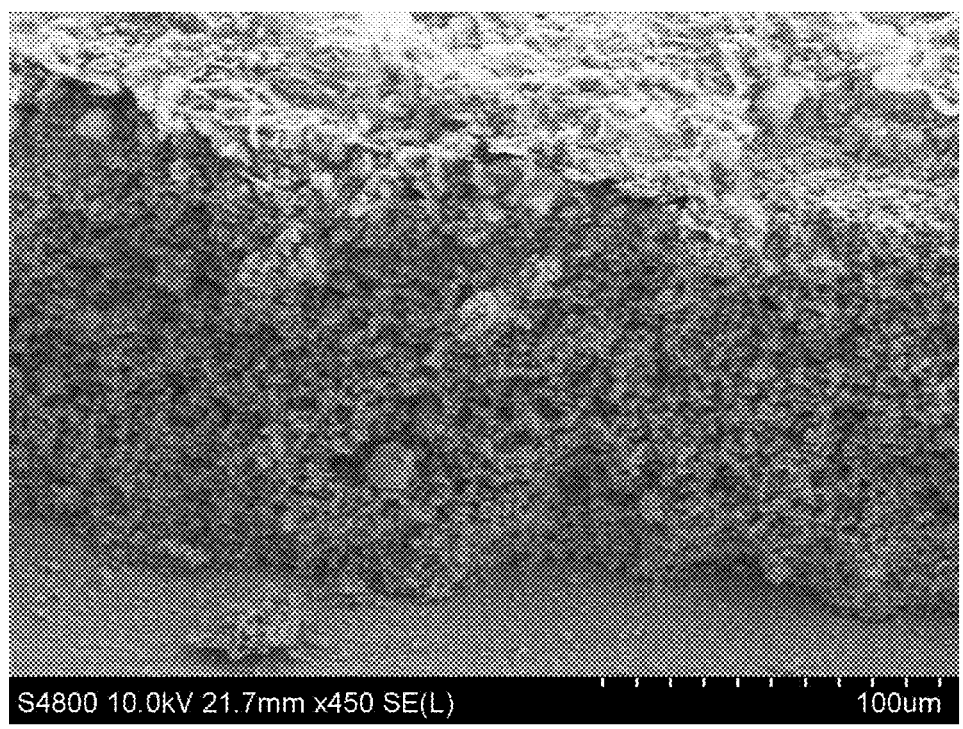
FIG. 3 is a cross section of a spray coating, approximately 100 μm in thickness, according to Example 1.

FIGS. 2A and 2B show surface images (scanning electron microscope, SEM) following spray coating and curing. In FIG. 2A, a high magnification SEM image shows the composite structure with anisotropic micron-sized $CaCO_3$ templates, silazane-treated silica nanoparticles, and a continuous polymeric matrix binding the two together along with micron-sized voids creating a rough textured surface. In FIG. 2B, a low magnification SEM image shows the homogeneity of the structure over longer length scales as well as the longer length scales of surface roughness. FIG. 3 shows a cross section of the spray coating, approximately 100 μm in thickness. Self similarity and porosity extending through the thickness of the coating are evident.

This structural coating is subjected to a freezing-point depression measurement. It is found that the freezing of a water droplet on this coating, cooled by a thermoelectric cooler, occurs at −14° C.±1° C. under atmospheric pressure, rather than at 0° C.

Example 2

Bahydrol 2770 (1 g), Bahydrol 2058 (0.16 g) and Bayhydur 2655 (0.5 g) are weighed out and combined into a 50 mL centrifuge tube. Following this, HMDZ-treated silica (0.5 g) is added to the container along with precipitated calcium carbonate (6 g, Magnum Fill SD). Finally, deionized water (10 g) is added, and the tube is capped and agitated vigorously for 1 minute. At this point, the mixture shows a thick creamy homogenous consistency. If any aggregates are visible, agitation is continued until the mixture is smooth.

Next, additional deionized water (20 g) is added to thin the mixture and the solution is blended with a high-speed mixer (Omni Mixer Homogenizer) for 5 minutes. The fluid solution is then transferred to a handheld sprayer and applied to panels. The full coating is deposited by coating the entire panel in layers and waiting for 15 minutes between coats until the desired coating thickness is achieved.

Figure 4A:
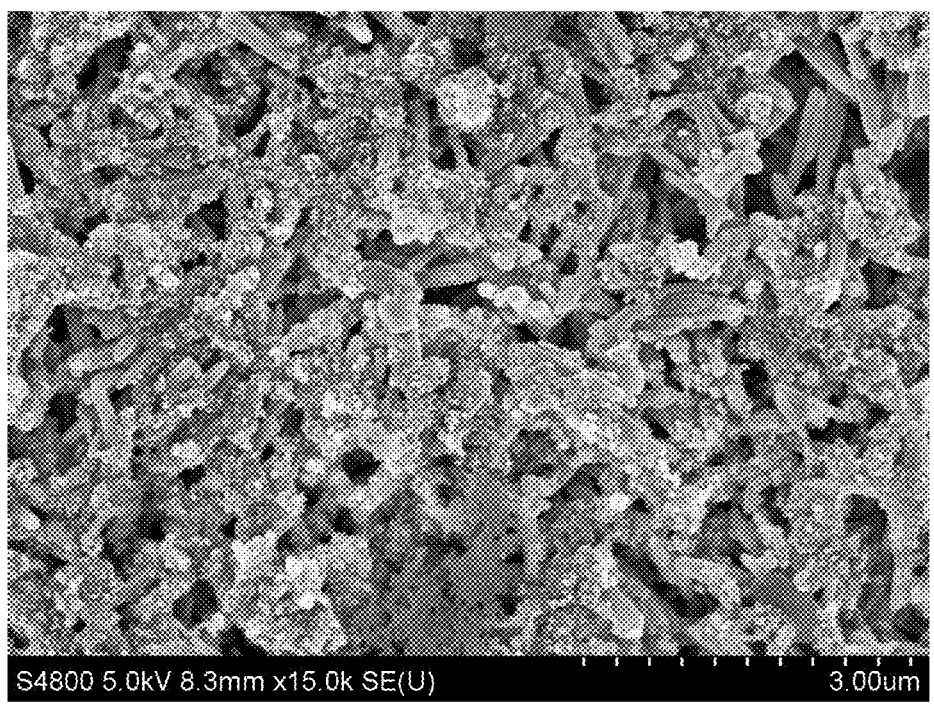
FIG. 4A is a high magnification SEM image of a structural coating according to Example 2.
Figure 4B:
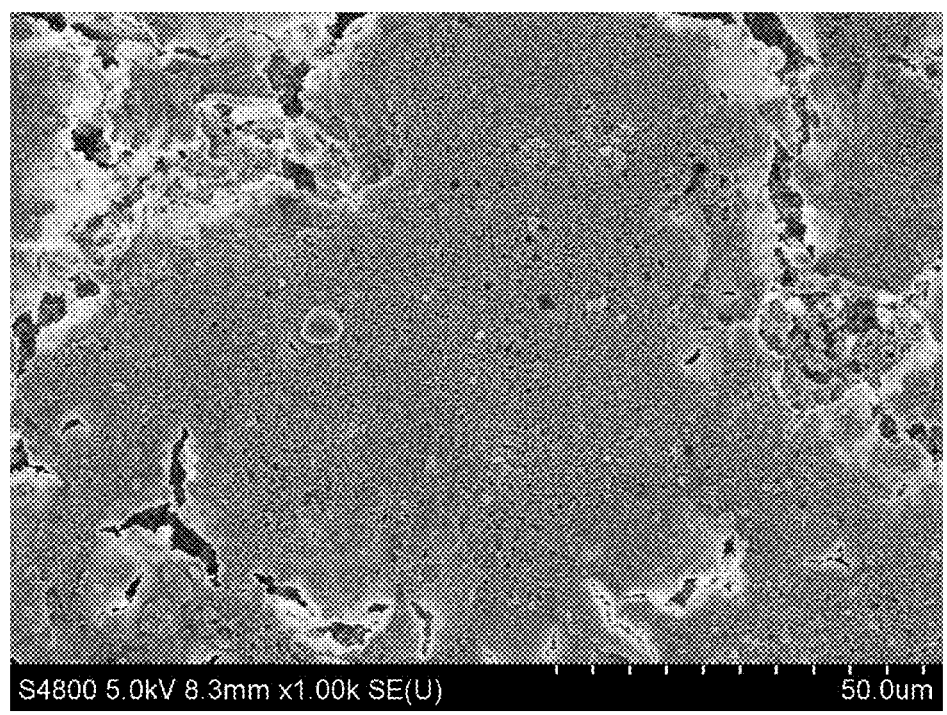
FIG. 4B is a low magnification SEM image of a structural coating according to Example 2.

In FIG. 4A, a high magnification SEM image shows discrete needlelike templating elements combined with nanoparticles and continuous polymeric matrix. In FIG. 4B, a low magnification SEM image shows homogeneity of the structural coating on longer length scales.

Example 3

Bahydrol 2770 (1 g), Bahydrol 2058 (0.16 g) and Bayhydur 2655 (0.5 g) are weighed out and combined into a 50 mL centrifuge tube. Following this, HMDZ-treated silica (0.5 g) is added to the container along with 500 nm polystyrene latex particles (6 g). Finally, deionized water (10 g) is added, and the tube is capped and agitated vigorously for 1 minute. At this point the mixture shows a thick creamy homogenous consistency. If any aggregates are visible, agitation is continued until the mixture is smooth.

Additional deionized water (20 g) is added to thin the mixture and the solution is blended with a high-speed mixer (Omni Mixer Homogenizer) for 1 minute. The fluid solution is then transferred to a handheld sprayer and applied to panels. The full coating is deposited by coating the entire panel in layers and waiting for 15 minutes between coats until the desired coating thickness is achieved.

Figure 5A:
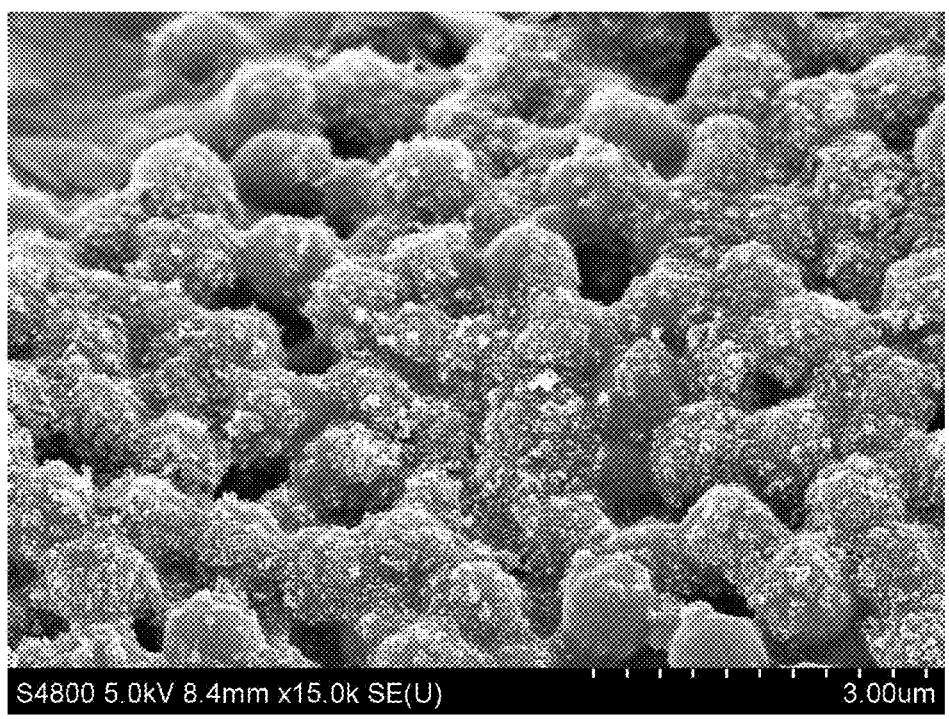
FIG. 5A is a high magnification SEM image of a structural coating according to Example 3.
Figure 5B:
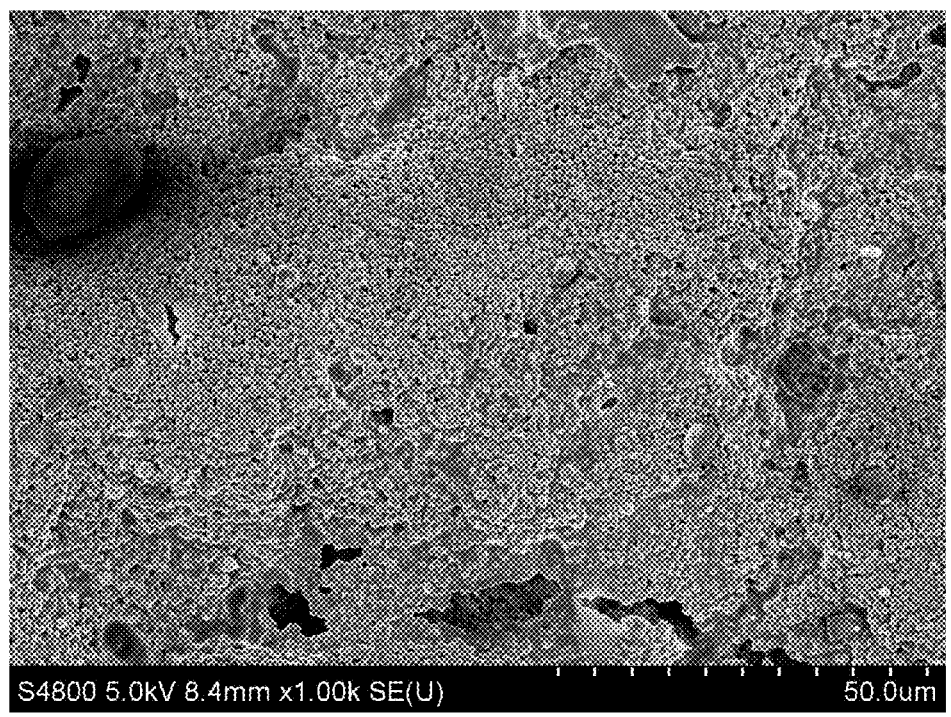
FIG. 5B is a low magnification SEM image of a structural coating according to Example 3.

In FIG. 5A, a high magnification SEM image shows spherical 500 nm polystyrene discrete templating elements combined with nanoparticles and continuous polymeric matrix. In FIG. 5B, a low magnification image shows homogeneity of the structural coating on longer length scales.

Example 4

The contact angle between a water droplet and the surface as well as roll-off angles are measured for the sample of Example 1. The contact angle is the effective contact angle of water $\theta_{\mathit{eff}}$ as described in the specification. The roll-off angle is the angle of the surface where water droplets begin to roll off of the surface. The sample of Example 1 is measured to have a contact angle of about 150° and a roll-off angle of about 10°. This sample exhibits a high contact angle that will reject water from the surface, and a low roll-off angle (good anti-wetting).

The contact angle between a water droplet and the surface as well as roll-off angles are measured for the sample of Example 2. The sample of Example 2 is measured to have a contact angle of about 70-90° and does not roll off the surface.

The contact angle between a water droplet and the surface as well as roll-off angles are measured for the sample of Example 3. The sample of Example 3 is measured to have a contact angle of about 110° and a roll-off angle of about 90°.

Example 5

The kinetic delay of freezing is measured for the sample of Example 1. The kinetic delay of freezing is measured by placing a 50 µL drop of deionized water on the coating surface held at −5° C. and −10° C. with a thermoelectric cooler. The time for the droplet to completely freeze is visually noted. The procedure was repeated three times with the average±standard deviation being reported. The sample of Example 1 is measured to have a kinetic delay of freezing of 81±12.8 seconds at −5° C. and 92±20.0 seconds at −10° C., compared to delay times of 31±0.6 seconds and 32±11.0 seconds, respectively, for an untreated aluminum substrate. These long delay times for the sample of Example 1 are believed to result from a high degree of surface roughness to slow thermal conduction as well as nanoparticles present at the surface to inhibit heterogeneous nucleation. This is highlighted by the delay times of 48±1.5 seconds at −5° C. and 48±3.8 seconds at −10° C. for a different sample with only nanoparticle inclusion.

The kinetic delay of freezing is measured for the sample of Example 2. The kinetic delay of freezing is measured by placing a 50 µL drop of deionized water on the coating surface held at −5° C. and −10° C. with a thermoelectric cooler. The time for the droplet to completely freeze is visually noted. The sample of Example 2 is measured to have a kinetic delay of freezing of 45 seconds at −5° C. and 23 seconds at −10° C., compared to delay times of 31 seconds and 32 seconds, respectively, for an untreated aluminum substrate.

Example 6

The porosity of the Example 1 coating is measured using mercury (Hg) intrusion analysis by Micromeritics Analytical Services (Norcross, Ga., US). The coating is prepared for analysis by being scraped off an aluminum substrate with a razor blade and sent as a powder for analysis. The sample has a surface area of 17.3 m$^2$/g and a pore volume of 1.98 g/cm$^3$. Cumulative intrusion volume data indicates that some of the surface area and pore volume are due to the coarse powder of scraped coating.

Figure 6A:
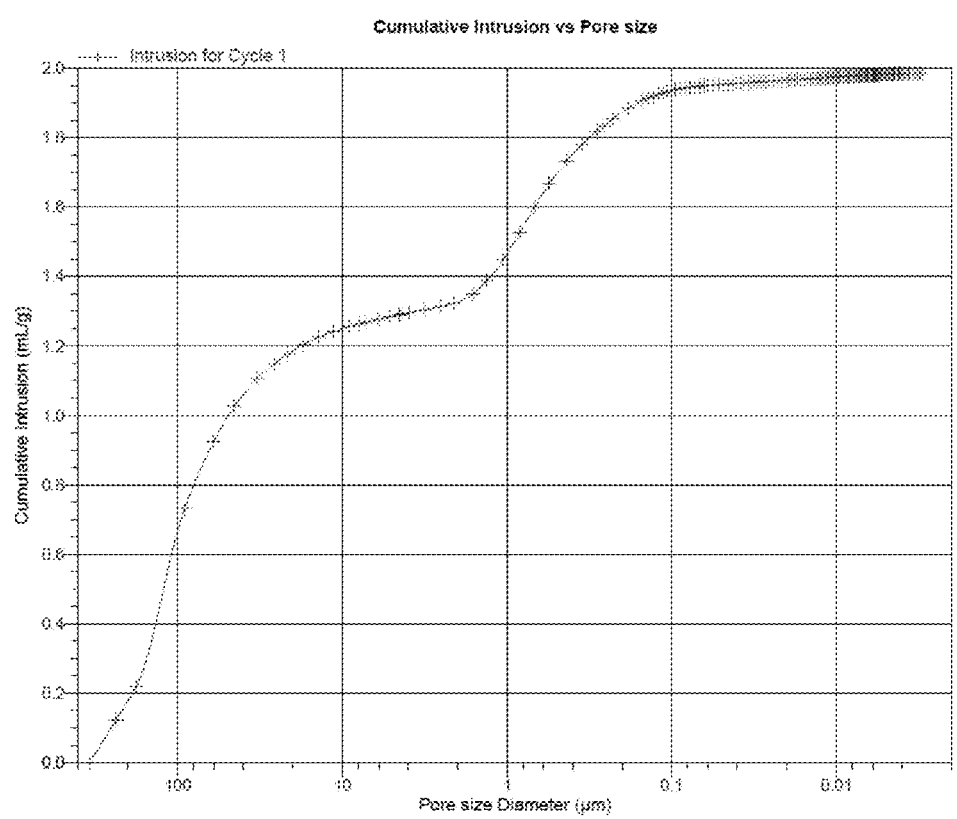
FIG. 6A is a graph of cumulative Hg intrusion versus pore diameter for an exemplary structural coating, according to Example 6.
Figure 6B:
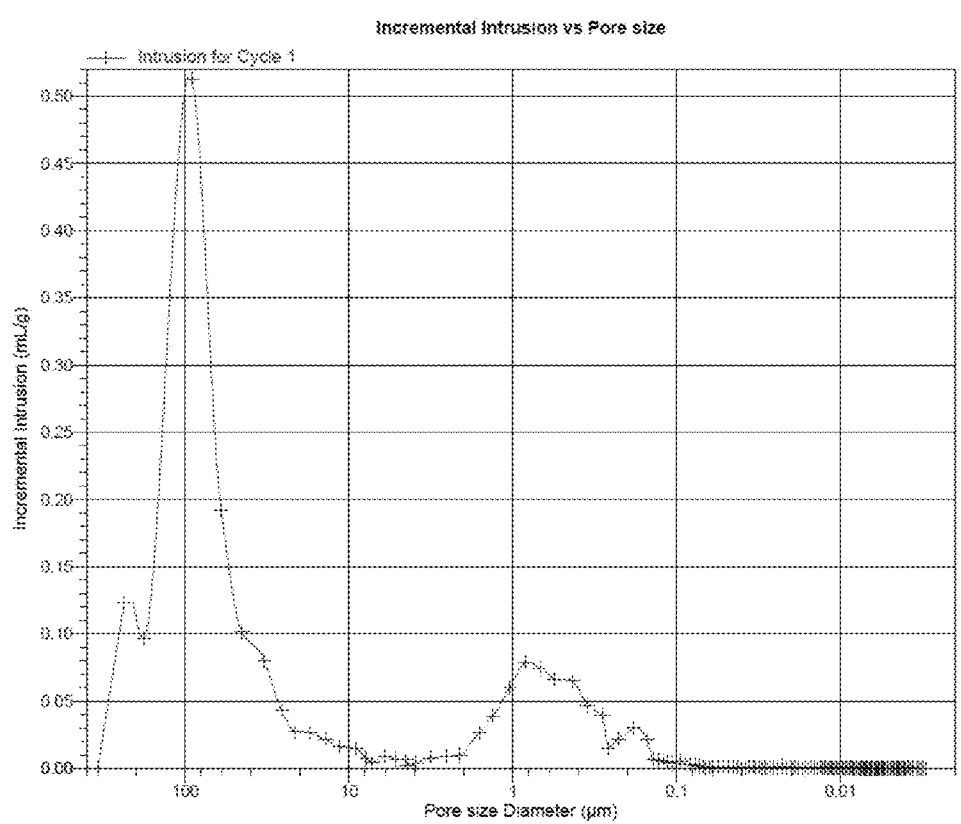
FIG. 6B is a graph of incremental intrusion versus pore diameter for an exemplary structural coating, according to Example 6.

FIG. 6A shows the cumulative intrusion versus pore diameter. FIG. 6B shows the incremental intrusion versus pore diameter. There are two types of intrusion, according to FIGS. 6A and 6B. The first type is from >100 µm to about 4 µm, which is due to intrusion around the coarse powder of scraped coating. The second type from about 4 µm to about 0.01 µm is due to intrusion of Hg into the coating. FIG. 6B, which reveals incremental intrusion (volume of Hg forced in per step), clearly indicates two types of intrusion.

Because the first intrusion type described above is from a coating scraped off a surface and broken apart, and is not representative of the surface coating, the more relevant pore volume and surface area can be found by using only the data for intrusion steps <4 µm, i.e., the second intrusion type. The coating has pore volume=0.69 cm$^3$/g and surface area=17.1 m$^2$/g. It is not surprising that the porosity between the coarse powder makes up a majority of the pore volume (larger pores take up more volume), but comprises a small amount of the surface area (coarse powders have little surface area).

According to the Hg intrusion measurements, it is found that the solid material in the coating has a density of 1.68 cm$^3$/g. One gram of coating solid takes up 0.595 cm$^3$ (occupied space) and has a pore volume (free space) of 0.69 cm$^3$. Thus the coating has a porosity of 0.69/(0.595+0.69)× 100=54%.

From the mercury intrusion data, the average void is 0.95 µm in diameter. If we assume a void is spherical, we estimate a void density of 1.196×10$^{12}$ voids per cm$^3$ of coating. The coating has a mass ratio of 1:0.5:6 polymer:silica:CaCO$_3$. Of the 0.595 g solid, 0.476 g is CaCO$_3$, which suggests a CaCO$_3$ density of 0.476 g/1.285 cm$^3$=0.37 g/cm$^3$.

Comparative Example

This comparative example evaluates a polyurethane matrix containing hydrophobic silica with no large discrete templates present.

Bahydrol 2770 (1 g), Bahydrol 2058 (0.16 g), and Bayhydur 2655 (0.5 g) are weighed out and combined into a 50 mL centrifuge tube. Following this, HMDZ-treated silica (0.5 g) is added to the container. Finally, deionized water (10 g) is added, and the tube is capped and agitated vigorously for 1 minute. At this point the mixture shows a liquid, cloudy consistency. The fluid solution is then transferred to a handheld sprayer and applied to aluminum panels. The full coating is deposited by coating the entire panel in a single layer.

The contact angle between a water droplet and the surface as well as roll-off angles are measured for the sample. The sample of this comparative example is measured to have a contact angle of between 70-100° and pins at a 90° tilt angle (does not roll off).

The invention disclosed herein has various commercial and industrial applications. Aerospace applications involve anti-icing coatings for both passenger and unmanned aerial vehicles. Automotive applications include coatings that help reduce ice buildup on moving external parts such as louvers, coatings for car grills, and coatings for protecting radiators or heat exchangers from ice build-up. Strongly anti-wetting surfaces also have the benefit of rapidly removing dirt and debris when flushed with water for a self-cleaning property that could be of benefit to multiple automotive surfaces.

Other applications include, but are not limited to, refrigeration, roofs, wires, outdoor signs, marine vessels, power lines, wind turbines, oil and gas drilling equipment, telecommunications equipment, as well as in many commercial and residential refrigerators and freezers. The principles taught herein may be applied to self-cleaning materials, anti-adhesive coatings, corrosion-free coatings, etc.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A structural coating that inhibits wetting and freezing of water, said structural coating comprising a plurality of layers, wherein each layer includes:
    (a) a substantially continuous matrix comprising a hardened material;
    (b) a plurality of discrete templates dispersed within said matrix, wherein said discrete templates are chemically different than said continuous matrix, wherein said discrete templates have an average template length scale from about 75 nanometers to about 10 microns, wherein said discrete templates promote surface roughness at a surface of said layer, and wherein said surface roughness inhibits wetting of water;
    (c) porous voids surrounding at least a portion of said discrete templates, wherein said porous voids have an average pore length scale from about 50 nanometers to about 5 microns, and wherein said average pore length scale is less than said average template length scale; and
    (d) a plurality of nanoparticles with an average size of about 50 nanometers or less within said matrix, wherein said nanoparticles are disposed on pore surfaces of said porous voids, wherein said nanoparticles are chemically different than said discrete templates, and wherein said nanoparticles inhibit heterogeneous nucleation of water,
    wherein said structural coating has a thickness from about 5 microns to about 500 microns.

2. The structural coating of claim 1, wherein said thickness is from about 50 microns to about 100 microns.

3. The structural coating of claim 1, wherein said discrete templates are uniformly dispersed within said matrix.

4. The structural coating of claim 1, wherein at least some of said discrete templates are anisotropic.

5. The structural coating of claim 1, wherein at least some of said discrete templates are geometrically asymmetric.

6. The structural coating of claim 1, wherein said discrete templates have an average template length scale from about 100 nanometers to about 3 microns.

7. The structural coating of claim 1, wherein said structural coating has an average density of discrete templates from about 0.1 to about 0.5 g/cm$^3$.

8. The structural coating of claim 1, wherein said porous voids have an average pore length scale from about 50 nanometers to about 900 nanometers.

9. The structural coating of claim 1, wherein said structural coating has a void density from about $10^{11}$ to about $10^{13}$ voids per cm$^3$.

10. The structural coating of claim 1, wherein said structural coating has a porosity from about 20% to about 70%.

11. The structural coating of claim 1, wherein said nanoparticles have an average particle size from about 5 nanometers to about 50 nanometers.

12. The structural coating of claim 1, wherein at least a portion of said plurality of nanoparticles is disposed on or adjacent to surfaces of said discrete templates.

13. The structural coating of claim 12, wherein said nanoparticles are chemically and/or physically bonded to or associated with said discrete templates.

14. The structural coating of claim 1, wherein said hardened material comprises a crosslinked polymer selected from the group consisting of polyurethanes, epoxies, acrylics, phenolic resins including urea-formaldehyde resins and phenol-formaldehyde resins, urethanes, siloxanes, and combinations thereof.

15. The structural coating of claim 1, wherein said matrix further comprises one or more additives selected from the group consisting of fillers, colorants, UV absorbers, defoamers, plasticizers, viscosity modifiers, density modifiers, catalysts, and scavengers.

16. The structural coating of claim 1, wherein said discrete templates comprise an inorganic templating material selected from the group consisting of calcium carbonate, sodium chloride, sodium bromide, potassium chloride, tin (II) fluoride, iron oxides, and combinations thereof.

17. The structural coating of claim 16, wherein said discrete templates comprise anisotropic calcium carbonate particles.

18. The structural coating of claim 1, wherein said discrete templates are surface-modified with a compound selected from the group consisting of fatty acids, silanes, alkyl phosphonates, alkyl phosphonic acids, alkyl carboxylates, and combinations thereof.

19. The structural coating of claim 1, wherein said nanoparticles comprise a nanomaterial selected from the group consisting of silica, alumina, titania, zinc oxide, carbon, graphite, polytetrafluoroethylene, polystyrene, polyurethane, silicones, and combinations thereof.

20. The structural coating of claim 1, wherein said nanoparticles are surface-modified with a hydrophobic material selected from alkylsilanes, fluoroalkylsilanes, alkyldisilazanes, or combinations thereof.

21. The structural coating of claim 1, wherein said structural coating is characterized by a water contact angle of about 110° or higher.

22. The structural coating of claim 1, wherein said structural coating is characterized by a water contact angle of about 150° or higher.

23. The structural coating of claim 1, wherein said structural coating is characterized by a water roll-off angle of about 10° or less.

24. The structural coating of claim 1, wherein said structural coating is characterized by an ice melting-point depression to at least −10° C.

25. The structural coating of claim 1, wherein said structural coating is characterized by a kinetic delay of water freezing of at least 75 seconds.

26. A structural coating that inhibits wetting and freezing of water, said structural coating comprising:
  (a) a substantially continuous matrix comprising a hardened material;
  (b) a plurality of discrete templates dispersed within said matrix, wherein said discrete templates are chemically different than said continuous matrix, wherein said discrete templates have an average template length scale from about 75 nanometers to about 10 microns, wherein said discrete templates promote surface roughness at a surface of said structural coating, and wherein said surface roughness inhibits wetting of water; and
  (c) a plurality of nanoparticles with an average particle size from about 5 nanometers to about 50 nanometers within said matrix, wherein said nanoparticles are chemically different than said discrete templates, and wherein said nanoparticles inhibit heterogeneous nucleation of water,
  wherein said structural coating has a thickness from about 5 microns to about 500 microns; and
  wherein said structural coating contains porous voids that are uniformly distributed within said matrix, with a void density from about $10^{11}$ to about $10^{13}$ voids per cm$^3$.

27. The structural coating of claim 26, wherein said thickness is from about 25 microns to about 200 microns.

28. The structural coating of claim 26, wherein said thickness is less than 25 microns.

29. The structural coating of claim 26, wherein said average template length scale is from about 100 nanometers to about 3 microns.

30. The structural coating of claim 26, wherein said porous voids have an average pore length scale from about 50 nanometers to about 5 microns, and wherein said average pore length scale is less than said average template length scale.

31. The structural coating of claim 30, wherein said average pore length scale is from about 50 nanometers to about 1 micron.

32. The structural coating of claim 26, wherein said porous voids surround at least a portion of said discrete templates.

33. The structural coating of claim 26, wherein said nanoparticles are disposed on pore surfaces of said porous voids.

34. The structural coating of claim 26, wherein said nanoparticles are chemically and/or physically bonded to or associated with said discrete templates.

35. The structural coating of claim 26, wherein said hardened material comprises a crosslinked polymer selected from the group consisting of polyurethanes, epoxies, acrylics, phenolic resins including urea-formaldehyde resins and phenol-formaldehyde resins, urethanes, siloxanes, and combinations thereof.

36. The structural coating of claim 26, wherein said matrix further comprises one or more additives selected from the group consisting of fillers, colorants, UV absorbers, defoamers, plasticizers, viscosity modifiers, density modifiers, catalysts, and scavengers.

37. The structural coating of claim 26, wherein said discrete templates comprise an inorganic templating material selected from the group consisting of calcium carbonate, sodium chloride, sodium bromide, potassium chloride, tin (II) fluoride, iron oxides, and combinations thereof.

38. The structural coating of claim 26, wherein said discrete templates are surface-modified with a compound selected from the group consisting of fatty acids, silanes, alkyl phosphonates, alkyl phosphonic acids, alkyl carboxylates, and combinations thereof.

39. The structural coating of claim 26, wherein said nanoparticles comprise a nanomaterial selected from the group consisting of silica, alumina, titania, zinc oxide, carbon, graphite, polytetrafluoroethylene, polystyrene, polyurethane, silicones, and combinations thereof.

40. The structural coating of claim 26, wherein said nanoparticles are surface-modified with a hydrophobic material selected from alkylsilanes, fluoroalkylsilanes, alkyldisilazanes, or combinations thereof.

* * * * *